(12) United States Patent
Kowaka et al.

(10) Patent No.: US 9,392,131 B2
(45) Date of Patent: Jul. 12, 2016

(54) IMAGE FORMING APPARATUS WITH PRINT PREVIEW DISPLAYED WITHIN A PAPER STACK IMAGE

(75) Inventors: Makoto Kowaka, Osaka (JP); Tetsuya Matsusaka, Osaka (JP); Akihiko Ikazaki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 1397 days.

(21) Appl. No.: 12/009,769

(22) Filed: Jan. 22, 2008

(65) Prior Publication Data

US 2008/0151300 A1 Jun. 26, 2008

(30) Foreign Application Priority Data

Jan. 24, 2007 (JP) .................................. 2007-013744

(51) Int. Cl.
  *G06F 17/00* (2006.01)
  *H04N 1/00* (2006.01)
  *G06F 17/21* (2006.01)

(52) U.S. Cl.
  CPC .......... *H04N 1/00442* (2013.01); *G06F 17/212* (2013.01); *H04N 1/00448* (2013.01); *H04N 1/00458* (2013.01); *H04N 2201/0082* (2013.01); *H04N 2201/0094* (2013.01)

(58) Field of Classification Search
  CPC .................................................... G06F 17/212
  USPC ....................................................... 715/274
  See application file for complete search history.

(56) References Cited

U.S. PATENT DOCUMENTS

| | | | |
|---|---|---|---|
| 5,666,208 A * | 9/1997 | Farrell et al. | 358/296 |
| 5,900,876 A * | 5/1999 | Yagita et al. | 715/776 |
| 7,081,882 B2 | 7/2006 | Sowden et al. | |
| 7,103,837 B2 * | 9/2006 | Sato | 715/274 |
| 2002/0002570 A1 * | 1/2002 | Sakai et al. | 707/526 |
| 2003/0020687 A1 | 1/2003 | Sowden et al. | |
| 2004/0039750 A1 * | 2/2004 | Anderson et al. | 707/103 R |
| 2004/0177336 A1 | 9/2004 | Kujirai | |
| 2007/0070470 A1 * | 3/2007 | Takami et al. | 358/527 |

FOREIGN PATENT DOCUMENTS

| | | |
|---|---|---|
| JP | 4-373073 | 12/1992 |
| JP | 7-261725 | 10/1995 |
| JP | 2003-087560 | 3/2003 |
| JP | 2003-140802 | 5/2003 |
| JP | 2004-164105 | 6/2004 |

* cited by examiner

*Primary Examiner* — Laurie Ries
(74) *Attorney, Agent, or Firm* — Jordan and Koda PLLC

(57) ABSTRACT

For a duplex print job a display portion of the image forming apparatus shows a stack image of one or more papers. A top paper in the image appears to have a corner turned over revealing a portion of the back side of the top paper, and revealing a portion of a front side of a second paper in the stack. Within the stack image, the image portion of the front side of the top paper shows a print preview of a front side of a first sheet in the duplex print job. Image portions corresponding to the back side of the top paper and the front side of the second paper show, respectively, print preview of the back side of the first sheet and front side of a second sheet. The page images may be displayed at a glance for multiple pages in a two up fashion.

5 Claims, 4 Drawing Sheets

IMAGE FORMING APPARATUS WITH PRINT PREVIEW DISPLAYED WITHIN A PAPER STACK IMAGE

BACKGROUND OF THE INVENTION

1. Field of the Invention

The present invention relates to an image forming apparatus with a display function for print preview, and a computer program to perform print preview processing.

2. Description of the Related Art

In the image forming apparatuses, such as copiers and facsimiles, there is a kind that comprises the print preview function. The print preview function enables displaying an image (a preview image) of the appearance of when the page image, that is the image of one page or a plurality of pages scanned from an original manuscript, is output (formed) onto a paper, on a display unit of such as a liquid crystal panel, based on a print data of the above-mentioned page image. This print preview function plays an important role for preventing unwilling image formation and useless consumption of paper and developer.

For example, Literature 1 (Japanese Unexamined Patent Application Publication No. 2004-164105) discloses, when performing both-side printing (printing on the front and back) for a planned book binding, the print result is previewed by displaying each of the page images aligned on a display unit.

And also, Literature 2 (Japanese Unexamined Patent Application Publication No. H04-373073) discloses to display reduced page images of a plurality of pages partially overlapped and aligned on a display unit.

And now, it is important to confirm a print result of both-side printing to be confirmable on a preview image about both of the page order and the front-back relationship (relations between the front and back) of each of the page image prior to printing (image forming). Especially, when a plurality of paper obtained by both-side printing is planned to be bound up (for a book), it is desirable to intuitively confirm about both of the page order and the front-back relationship of each page image, on a preview image in an actually bound status.

However, when previewing the print result of both-side printing, as in Literatures 1 and 2, it has been difficult to intuitively understand both of the page order and the front-back relationship of each of the page images only by displaying a preview image of each of the aligned page images.

In view of the above problems residing in the prior arts, it is a purpose of the present invention to provide an image forming apparatus and a program for print preview which enables to display a preview image of a print result of both-side printing that allows intuitive understanding of both of the page order and the front-back relationship of each of the page images.

SUMMARY OF THE INVENTION

In order to achieve the above purpose, an image forming apparatus according to the present invention comprises a function for displaying a print preview image of a page image on a display unit based on a print data related to the page image of a plurality of pages recorded in a prescribed memory, and further comprises the following constituent elements described in (1) and (2).

(1) a page identifying member for identifying a page of the page image, that is to be formed on a front surface of a print media when both-side printing based on the print data is performed, according to an information input through a prescribed operating member.

(2) a preview outputting member for displaying on the display unit the print preview image which includes an image: turned-over image, indicating partially the page images of three pages counted from the page that is identified by the page identifying member. Said page images of three pages are, under a condition where a plurality of print medias are stacked and the uppermost one is partially turned over, displayed on each of: a first area corresponding to the front surface section of the uppermost print media, a second area corresponding to the back surface section of the uppermost print media, and a third area corresponding to the front surface section of the second print media.

The print preview image prepared by an image forming apparatus according to the present invention is an image collectively displaying partial page images of each of at least three continuing pages. Moreover, the print preview image is therefore an image indicating the appearance of when the actual print medias obtained by both-side printing is turned over with fingers, and it is immediately obvious that the order of the images: the first area, and the second area, and then the third area, indicates the page order of the page images. Consequently, the print preview image prepared by an image forming apparatus according to the present invention is an image which allows intuitive (immediate) understanding of the content and the page order of the page images of at least continuing three pages, with only a glance.

And also, in the print preview image, the page images of the second and the third pages are partially displayed on the sections (the second area and the third area) disposed by partially turning over the print media on which the page image of the first page is formed in its front surface. Consequently, the print preview image prepared by an image forming apparatus according to the present invention is an image, which allows intuitive (immediate) understanding of the front-back relationship telling how the page images from the first page to the third page are formed on the print media, with only a glance.

Additionally, in a print media on which an image is to be formed by both-side printing processing, the surface on which a page image of relatively smaller page number is to be formed is the front surface, and the surface on which a page image of relatively larger page number is formed is the back surface.

And also, the preview outputting member may display on the display unit the print preview image, in which the page image of a page previous to the page identified by the page identifying member and the turned-over image are aligned in a double-page spread.

This allows displaying a print preview image, which enables intuitive understanding of the content, the page order and the front-back relationship in a print media about the page images of continuing four pages.

More particularly, the preview outputting member may, for example, display on the first area in the turned-over image, a part of the page image to be formed on a section corresponding to the first area by both-side printing based on the print data, just as it is.

And also, an image forming apparatus according to the present invention may further comprise a partial image extractor for extracting a partial image from each of the page images of two pages (the second and the third pages) subsequent to the page which is identified by the page identifying member, in accordance with a predetermined rule. In this case, the preview outputting member displays each of the images extracted by the partial image extractor on each of the second area and the third area in the turned-over image.

This allows a particular part for easy understanding of the content of each page image to be extracted and displayed on a narrow section of turned-over (the second and the third areas).

For example, the partial image extractor may extract an image of a partial area predetermined in the page image, an image of the area having the highest image density in the page image, or a photographic image included in the page image.

Additionally, the preview outputting member may switch two conditions according to an input operation through a prescribed operating member: one condition in which a part of the page image to be formed on a section corresponding respectively to the second area and the third area by both-side printing based on the both-side print data is displayed on each of the second and the third areas in the turned-over image just as it is, and another condition in which an image extracted by the partial image extractor is respectively displayed on each of the second area and the third area in the turned-over image.

In addition, the preview outputting member may display on the display unit the print preview image including an image: extracting-position indicating image, which indicates the position of an image that was extracted by the partial image extractor to display it on each of the second area and the third area in the turned-over image from.

For example, the extracting-position indicating image is such as an arrow image that is vector-representing a position of each of the images extracted by the partial image extractor started from each of the first area and the second area. Displaying the extracting-position indicating image allows easy understanding of the content of a page image in a page corresponding to the turned-over section (the first and the second areas).

The present invention may also be realized as a print preview program for a computer to perform the above-mentioned process (display processing of the print preview image on a display unit) conducted by an image forming apparatus according to the present invention.

According to the present invention, in regard to a print result of both-side printing, to display a preview image which allows intuitive understanding of both of the page order and the front-back relationship in a print media of each page image can be achieved.

DETAILED DESCRIPTION OF THE PREFERRED EMBODIMENTS

With embodiments of the present invention described hereinafter with reference to the accompanying drawings, it is to be understood that the invention is not limited to those precise embodiments, and that various changes and modifications may be effected therein by one skilled in the art without departing from the scope or spirit of the invention as defined in the appended claims.

Figure 1:
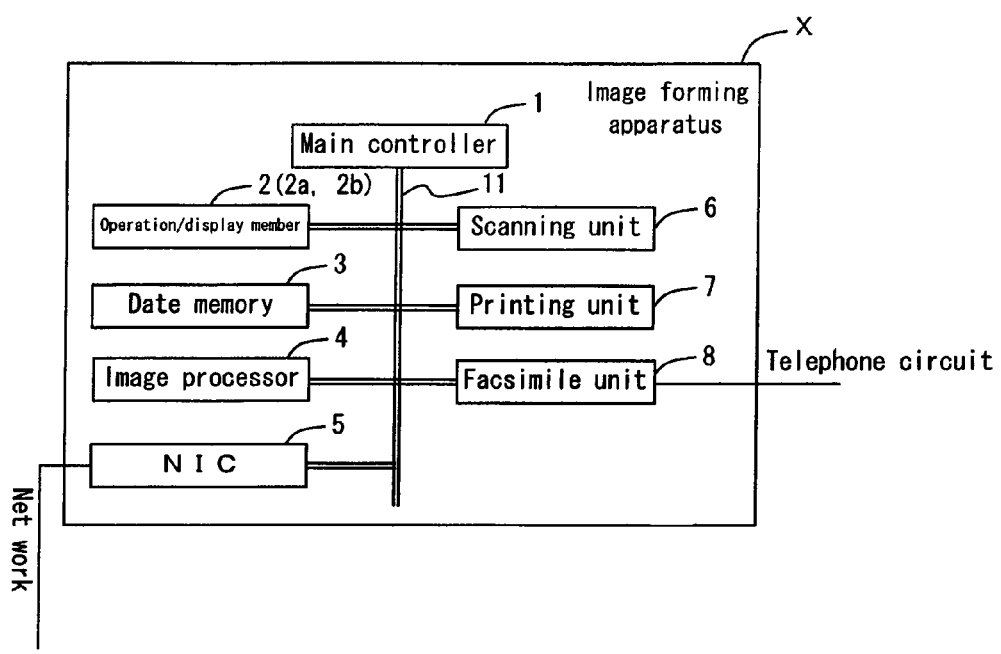
FIG. 1 is a block diagram showing a structure of a main part of an image forming apparatus X according to an embodiment of the present invention.
Figure 2:
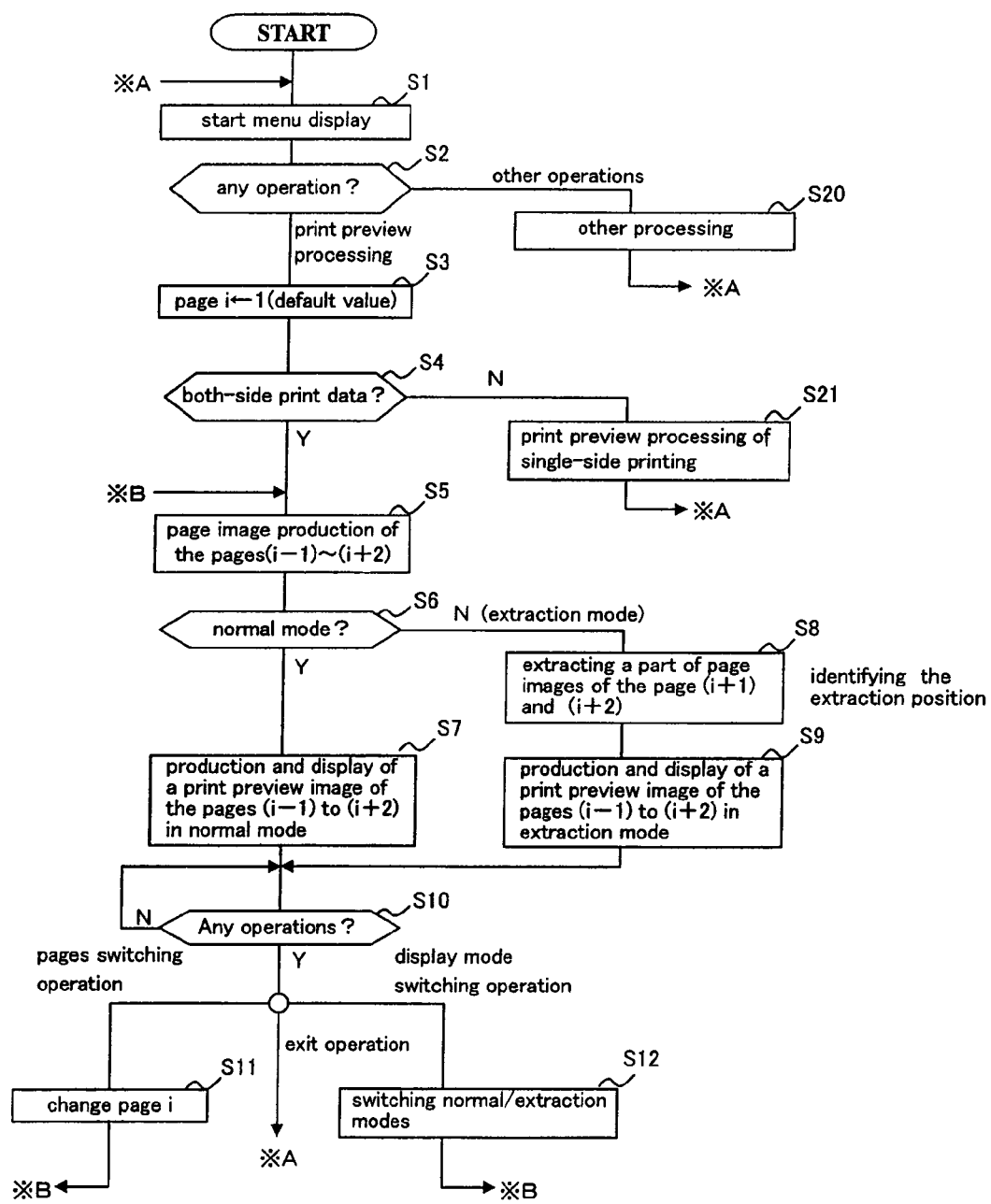
FIG. 2 is a flowchart showing the steps of display processing of a print preview according to an image forming apparatus X.
Figure 3:
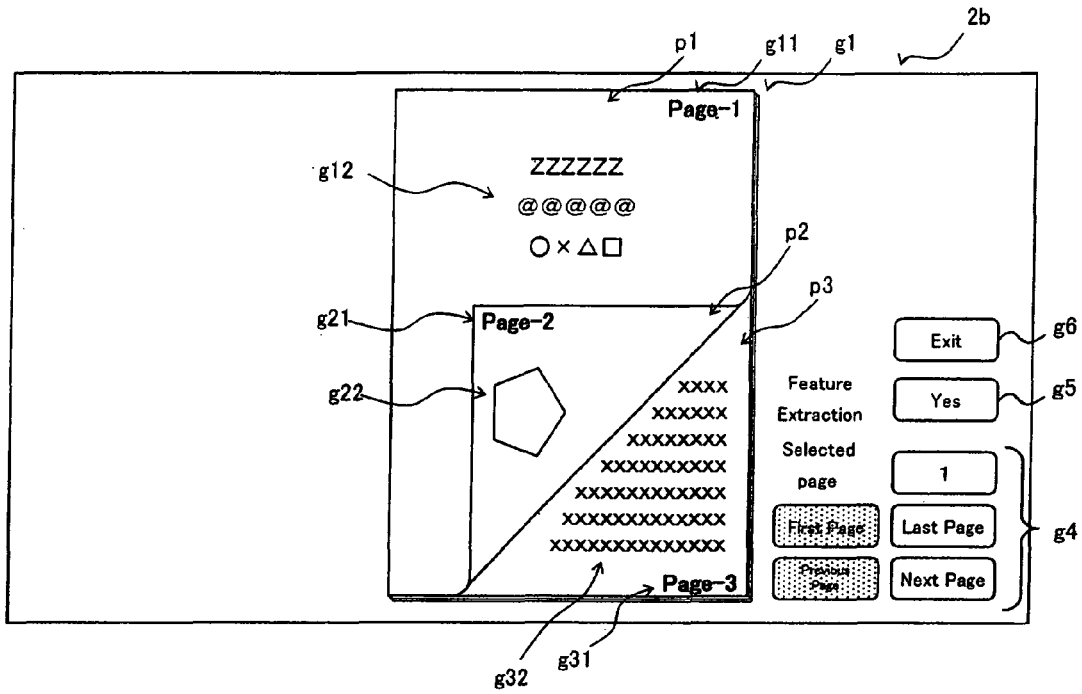
FIG. 3 shows a first example of a print preview screen according to an image forming apparatus X.
Figure 4:
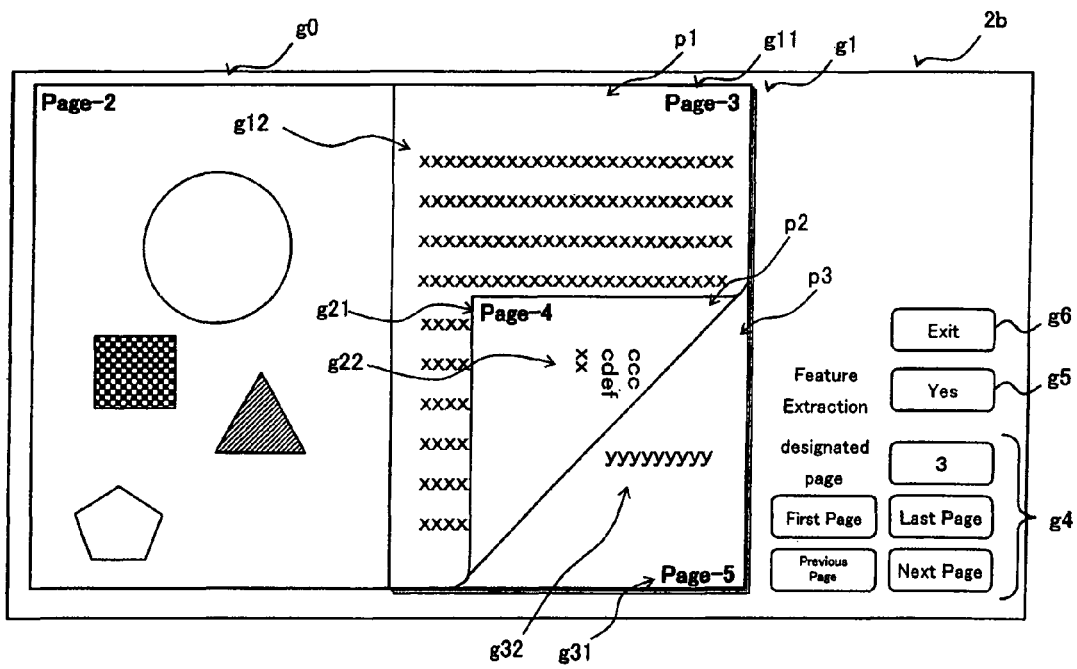
FIG. 4 shows a second example of a print preview screen according to an image forming apparatus X.
Figure 5:
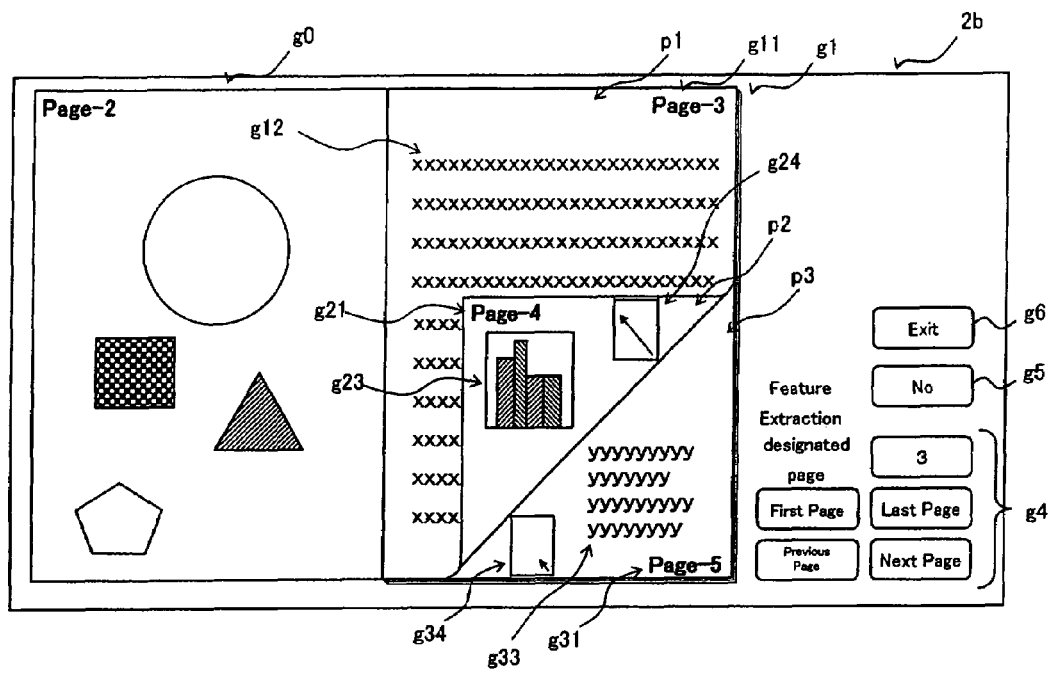
FIG. 5 shows a third example of a print preview screen according to an image forming apparatus X.
Figure 6:
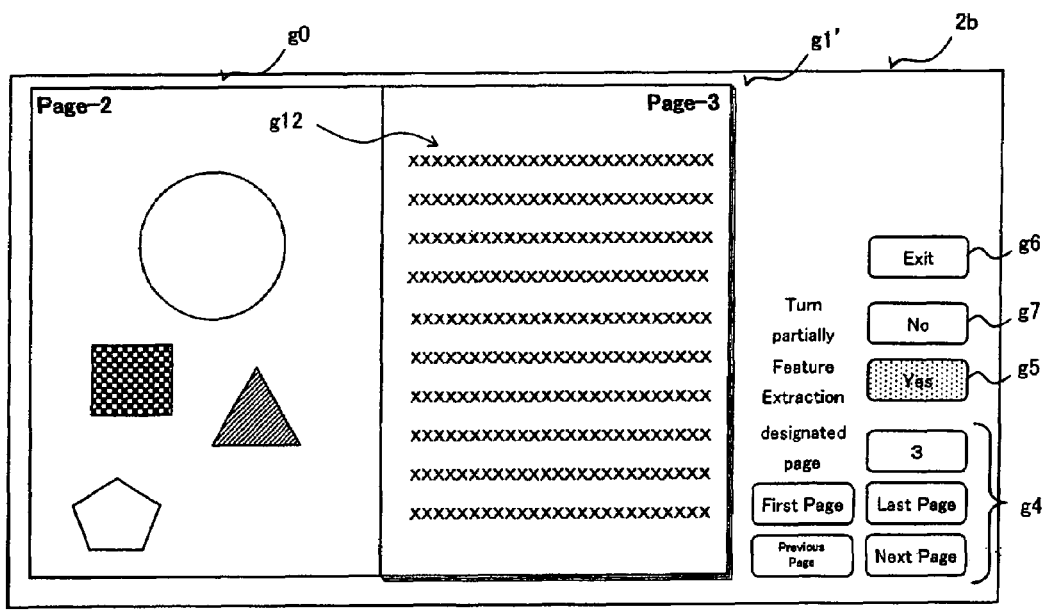
FIG. 6 shows a fourth example of a print preview screen according to an image forming apparatus X.

Here, FIG. 1 is a block diagram showing the structure of a main part of an image forming apparatus X according to an embodiment of the present invention; FIG. 2 is a flowchart showing the steps of print preview displaying processing according to an image forming apparatus X; FIG. 3 shows a first example of a print preview screen according to an image forming apparatus X; FIG. 4 shows a second example of a print preview screen according to an image forming apparatus X; FIG. 5 shows a third example of a print preview screen according to an image forming apparatus X; and FIG. 6 shows a fourth example of a print preview screen according to an image forming apparatus X.

An image forming apparatus X according to an embodiment of the present invention is an image forming apparatus such as a copier, a printer, and a facsimile, and comprises a function for displaying a print preview image of a page image on a display unit based on a print data that is related to the page image of a plurality of pages and previously recorded in a data memory such as a hard disk.

Firstly, as referring now to the block diagram illustrated in FIG. 1, the structure of a main part of an image forming apparatus according to an embodiment of the present invention is described.

An image forming apparatus X is an MFP (Multifunction Printer), comprising functions for scanning, printing, copying, and facsimile.

As illustrated in FIG. 1, the image forming apparatus X comprises: a main controller 1, an operation/display member 2, a data memory 3, an image processor 4, an NIC (Network Interface Card) 5, a scanning unit 6, a printing unit 7, and a facsimile unit 8 that are connected so as to be capable of passing information through a bus 11.

The operation/display member 2 comprises a operation member 2a for inputting data and a display unit 2b for displaying data (including images). The operation member 2a is, for example, a touch panel or a sheet key provided on the surface of a liquid crystal display device. The display unit 2b is, for example, a liquid crystal display device. The operation/display member 2 constructs a man-machine interface for a user.

The data memory 3 is a readable/writable, high-capacity nonvolatile memory for recording data as need arises, when conducting processing image data obtained by scanning an original manuscript or printing processing by using image data.

The image processor 4 is composed of such as a dedicated signal processing circuit or a DSP (Digital Signal Processor), and conducts conversion processing from a print job described in a prescribed page description language into a bitmap image data to be used for image formation, as well as production processing of image data to be transmitted to an external device (for example, image data encoded into a prescribed format, such as JPEG format), in addition to various image processing for image data.

The NIC5 is an communication interface for performing data transmission (including image data obtained by the scanning unit 6) between external devices such as information processing terminal and a e-mail server through, for example, a network composed of such as LAN (Local Area Network) complying with the standard of IEEE 802.3 and internet.

The scanning unit 6 is a color image scanner which scans, from an original manuscript put on a glass platen (not shown) or delivered from an ADF (Auto Document Feeder) (not shown), an image formed on the original manuscript as distinguishing its colors (R, G, and B).

The printing unit 7 is, so-called, a printing engine controlled by the main controller 1, and is also an assembly of components, such as a device for conducting image formation and an MPU (Micro Processing Unit) for controlling said device. The printing unit 7 feeds a paper stacked in a paper feeding cassette (not shown) sequentially and one-by-one, and delivers the paper to a paper catch tray via a prescribed image forming position, and furthermore, forms (outputs) at the image forming position an image on a paper (an example of print media) based on an image data of the original manuscript scanned by the scanning unit 6 or on an image data produced by the image processor 4 for printing. And also, the printing unit 7 comprises a function for conducting the both-side printing which performs image formation on both of the front and back surfaces of a paper.

The facsimile unit 8 comprises communication members such as an NCU (Network Control Unit) and a modem, and performs such as dial-up processing to a communication partner (opposing station) as well as negotiation processing for determining a communication method between the communication partner (opposing station), so as to conduct transmission of facsimile data (image data obtained by the scanning unit 6) with other facsimile via a telephone circuit.

The main controller 1 controls each of the scanning unit 6, the printing unit 7, the facsimile unit 8, the operation/display member 2, the data memory 3, and the image processor 4.

For example, the main controller 1 instructs the printing unit 7 to perform the print processing (image forming processing) based on a print job received via the NIC5. The main controller also instructs the facsimile unit 8 to conduct a facsimile-sending processing in which an image data of the sending subject is sent by calling a telephone number of a designated destination. Moreover, the main controller 1 instructs the scanning unit 6 to perform scanning processing to obtain from an original manuscript an image formed on the original manuscript.

In addition, the main controller 1 also conducts, based on a print data (such as image data and print job data) related to an image of one or a plurality of pages (hereinafter referred to as "page image") obtained from an original manuscript by the scanning unit 6, a print preview processing for displaying on the display unit 2b an image (preview image) of when the page image is output (formed) on a paper.

Subsequently, as referring to the flowchart in FIG. 2 and the print preview screens in FIGS. 3 to 6, the steps for the print preview processing to be performed by the image forming apparatus X is described.

The print data is previously recorded in the data memory 3 prior to the execution of the processing illustrated in FIG. 2. The print data is, as described above, a print job input from an external device via the NIC, or an image data scanned by the scanning unit 6. In addition, S1, S2 and so on in below are identification symbols representing the processing steps.

[Steps S1 to S4]

Firstly, the main controller 1 instructs the display unit 2b to display a prescribed start menu screen (S1), and monitors whether or not the selecting operation of a processing item in the start menu through the operation member 2a is detected (S2).

And then, on detecting that any of processing items is selected during display of the start menu, the main controller 1 conducts a processing according to the selecting operation.

In short, when the operation selected from the start menu is a requesting operation: a print preview operation, for a displaying print preview, the main controller 1 sets a parameter i representing the default page number (=1) (S3). The main controller 1 further distinguishes whether or not the print data recorded in the data memory 3 as the processing subject is a both-side print data, that has been previously selected as the subject for both-side printing (S4). The both-side print data is, such as a print job data or a scanned image data related to page images of a plurality of pages.

Additionally, the parameter i is representing the page number of a page image to be formed on the front surface of a paper when the later-described both-side printing is performed according to the both-side print data. In this embodiment, the parameter i is 1 or more of an odd value. Then the main controller performing the processing in the step S3 is an example of the page identifying member, which identifies the value of the parameter i on the basis of the data input through the operation member 2a (a data requesting the print preview display).

[Steps S5 and S6]

When the print data is distinguished as a both-side print data in the step S4, the main controller 1 then produces the data of page images of four pages: from the page (i−1) to the page (i+2), on the basis of the both-side print data (S5). In the step S5, in the page image of four pages: from the page (i−1) to the page (i+2), the image data related to the page not included in the both-side print data is apparently not the producing subject.

Next, the main controller 1 distinguishes, at this point, the display mode status of the print preview: "normal mode" or "extraction mode" (S6). The display mode is the information for identifying the kind of a print preview image to be displayed on the display unit 2b, in the display processing of a print preview image based on the both-side print data. The content of the display mode is described later. And also, the default state of the display mode is "normal mode", and then is switchable between "normal mode" and "extraction mode" according to the input operation through the operation member 2a.

[Step S7]

When the display mode is "normal mode", the main controller 1 produces data of a print preview image in "normal mode" based on the data of page images of four pages: from the page (i−1) to the page (i+2) produced in the step S5, and instructs the display unit 2b to display the print preview image.

FIGS. 3 and 4 are the example of a display screen showing a print preview image in "normal mode". FIG. 3 shows an example where a page image of the page (i−1) does not exist since the parameter i is 1, and FIG. 4 shows an example where page images of four pages from the page (i−1) to the page (i+2) exist since the parameter i is 3.

As shown in FIGS. 3 and 4, the print preview image displayed on the display unit 2b by instruction of the main controller 1 (an example of the preview outputting member) includes an image (hereinafter referred to as "turned-over image g1") indicating that a part (for example, bottom-right part) of the uppermost paper (page i) on the stacked plurality of paper is turned over. Therefore, there exist in the turned-over image g1, a first area p1 corresponding to the section on the front surface of the uppermost paper (page i), a second area p2 corresponding to the section on the back surface of the uppermost paper (page i+1), and a third area p3 corresponding to the section on the front surface of the second paper (page 1+2).

Additionally, the main controller 1 displays respectively on the first, second, and third areas p1, p2 and p3 in the turned-over image g1 partial page images g12, g22, and g32 of each of three pages counted from the page i that is identified by the processing in the step S3 or in the later-described step S9.

More particularly, the main controller 1, regardless of the display modes, displays on the first area p1 in the turned-over image g1 the image g12 (a partial page image) just as it is, that is formed by the both-side printing according to the both-side print data on the section corresponding to the first area p1, in other word, on the section that is remained in the page image of page i, excepting the part hidden by turning over the paper.

And also, in the normal mode, the main controller 1 displays, on each of the second area p2 and the third area p3 in the turned-over image g1, the partial page images g22 and g32 that is a part of the page images formed on the sections respectively corresponding to the second area p2 and the third area p3 by the both-side printing according to the both-side print data. This allows, in the example illustrated in FIG. 4, respectively the image g22 of the section in lower left corner of the page image of the page (i+1) to be displayed on the second area p2, and the image g32 of the section in lower right corner of the page image of the page (i+2) to be displayed on the third area p3.

Furthermore, the main controller 1 also displays respectively, on the first area p1, the second area p2, and the third area p3, page number data g11, g21, and g31 corresponding to each of the areas.

As shown in FIG. 4, the main controller 1 also displays on the display unit 2b a print preview image, in which a page image g0 of the page (i−1) that is previous to the page i, and the turned-over image g1 are aligned in a double-page spread (S7).

And the main controller 1 also displays an operation button g4 for switching the subject page for displaying, an operation button g5 for switching the display mode, and an exit button g6, together with the print preview image, on the display unit 2b, which is also the operation member 2a (S7).

[Step S8]

On the other hand, when the display mode is identified as "extraction mode", the main controller 1 instructs the image processor 4 to conduct an image extracting processing described in the following (S8). The image extracting processing is extracting a partial image respectively from the page images of two pages: the page (i+1) and the page (i+2), subsequent to the page i identified following to a predetermined role by the processing in the step S3 or a step S11 to be described later. Here, the image processor 4 identifies a position of the extracted image (extracting-position) in the page image, and report the position to the main controller 1. In addition, the image processor 4 is an example of the partial image extractor.

In the step S8, the image processor 4 performs, for example, the processing as described in below.

Firstly the image processor 4 distinguishes whether or not a photographic image is included in each of both page images of the page (i+1) and the page (i+2), and if so, extracts the photographic image.

Also, when distinguished that there is no photographic image included in both of the page images, the image processor 4 divides the entire page image into a plurality of predetermined-sized areas, and then, extracts an image having the highest image density among those divided areas.

Other than the above, in regard to the divided areas, when the density gap between the area having the highest image density and the area having the second highest image density is within a predetermined range (when the gap is small), the image processor 4 may also extract an image of a predetermined partial area in each of both of the page images, i.e., for example, an area of a prescribed range in vicinity of the upper-left corner.

Since the processing for identifying and extracting an area of a photographic image on the basis of an image data including the photographic image is a known art, and a detailed description thereof is omitted.

[Step S9]

When the display mode is "extraction mode", the main controller 1 produces a data of the print preview image in "extraction mode" based on the data of page images of four pages: from the page (i−1) to the page (i+2) produced in the step S5, and instructs the display unit 2b to display the print preview image (S9).

FIG. 5 shows an example of a display screen of a print preview image in "extraction mode". In the example in FIG. 5, the page parameter i is 3, and the page images of four pages from page 2 to page 5 (from the page (i−1) to the page (i+2)) is shown.

Even in "extraction mode", the main controller 1 displays on the first area p1 in the turned-over image g1 the image g12 just as it is, that is formed on the area corresponding to the first area p1 (i.e. the remaining section in the page image of the page i, excepting the section hidden by the turning-over of the paper) by the both-side printing processing based on the both-side print data.

On the other hand, in "extraction mode", the main controller 1 displays images g23 and g33 extracted by the image processor 4 in the step S8 respectively on the second area p2 and the third area p3 in the turned-over image g1 (S9: an example of the preview outputting member).

This allows extracting and displaying a particular part on a narrow section of turned-over (the second area p2 and the third area p3) for easy understanding of the content of each page image.

Additionally, in the "extraction mode", the main controller 1 also instructs the display unit 2b to display arrow images g24 and g34 indicating the extracting position (the position extracted in the processing in the step S8) of the images g23 and g33 to be displayed on each of the second area p2 and the third area p3 in the turned-over image g1 (S9). The arrow images g24 and g34 are for vector-representing the extracting-position of each of the images g23 and g33 extracted in the step S8 and are examples of the extracting-position indicating image.

Displaying the arrow images g24 and g34 allows easy understanding of the content of the page images of the page (i+1) and the page (i+2).

As an image indicating the extracting-position of the extracted images g23 or g33, instead of the arrow images g24 and g34, for example, an image having a prescribed mark (a circle or a star) arranged in a position corresponding to the extracting images g23 or g33 in a rectangle frame representing the entire page may be displayed.

[Steps S10 and S11]

Then, after completion of the processing in the steps S7 or S9, the main controller 1 monitors whether or not any of the operations for operation buttons g4, g5, and g6 on the operation member 2a are detected (S10), and performs the processing according to the operation.

In other words, when the operation (page switching operation) of the operation button g4 for switching the subject page for displaying is detected, the main controller 1 changes the value (page number) of the parameter i according to the operation (S11), and performs the processing described in the above steps 5 to 9 on the newly set page i.

For example, in the step S1, when the main controller 1 detects the operation of the 'Previous page' button or the 'Next page' button that are the example of the operation button g4 for switching the subject page for displaying, the main controller 1 reduces (−2) or adds (+2) the value of the parameter i. The main controller also set the value of the parameter i to 1 (the front page) or to the final odd number page (the back page) in the both-side print data, when the operation of the 'First page' button or the 'Last page' button is detected. Additionally, when the page is directly specified by the operation of a numerical key not shown, the main controller 1 set the parameter i to the value of the specified page when the specified page is an odd number, or to the value added 1 to the specified page when the specified page is an even number.

As just described, in the step S11, when the both-side printing based on the both-side print data is conducted according to the data input through the operation member 2a, the main controller 1 set (specify) the page of one page image to be formed on the front surface of a paper (one example of the page identifying member).

[Steps S12, S20, and S21]

In addition, when the operation of the operation button g5 for switching the display mode (mode switching operation) is detected, the main controller 1 switches the display mode (S12) and performs the processing described in the above steps S5 to S9 in the newly set display mode.

As described, the main controller 1 (an example of the preview outputting member) switches tow conditions according to the input operation through the operation member 2a: one condition in which a part of the page images g22 and g32 to be formed on the sections corresponding respectively to the second area p2 and the third area p3 by both-side printing based on the both-side print data is displayed on each of the second and the third areas p2 and p3 in the turned-over image g1 just as it is (the condition in FIG. 4), and another condition in which the images g23 and g33 extracted by the processing in the step S8 are respectively displayed on each of the second and the third areas p2 and p3 in the turned-over image g1 (the condition in FIG. 5).

This allows easy understanding of page images of the page (i+1) and the page (i+2).

In addition, the main controller 1 goes back to the processing in the above-mentioned step S1 when the operation of the Exit button g6 (finishing operation) is detected.

In the step S2, when an operation other than the print preview operation is detected while displaying the start menu, the main controller 1 performs the other processing according to the operation (S20), and after that, goes back to the processing in the above-mentioned step S1.

When the print data recorded in the data memory 3 as a processing subject is distinguished as a single-side print data preselected as a subject for single-side printing (not the both-side print data), the main controller 1 also conducts the print preview processing of the single-side print data (S21), and then, goes back to the processing in the above-mentioned step S1. Since the processing in the step S21 is not directly related to the processing according to the present invention, a detailed description thereof is omitted.

The image forming apparatus X described in the above instructs the display unit 2b to display, for example, the print preview image including the turned-over image g1 as illustrated in the FIGS. 3 and 4, and therefore, allows intuitive understanding of both of the page order of each page image and the front-back relationship of the paper as a print result of both-side printing.

According to the input of an operation button (e.g., the button g7 shown in FIG. 6) for selecting whether or not to display the turned-over image g1, the main controller 1 may also switch the print preview image to be displayed on the display unit 2b between the one including the turned-over image g1 as illustrated in FIGS. 3 to 5 and the one not including the turned-over image g1 as illustrated in FIG. 6. The example in FIG. 6 illustrates a print preview image, in which a page image g0 of the page (i−1) and a page image g1' of the page i are aligned in a double-page spread and displayed on the display unit 2b.

Additionally, in the examples shown in FIGS. 3 to 5, the turned-over image g1 indicates the state that the lower-right portion of a paper is turned over, however, the turned-over image, indicating that a section including the entire lower hem of the paper or the upper-right portion of the paper is turned over, may be displayed in a print preview image.

And the present invention may also realize as a print preview program for computers such as a personal computer to carry out the processing in FIG. 2 performed by the above-mentioned image forming apparatus X.

For example, prior to a transmittance of a print job from a computer to a printer, the computer may perform the print preview program and display a print preview image as illustrated in FIGS. 3 to 5 on a graphic display (display unit). The present invention is applicable to, such as, an image forming apparatus and a program for computers to conduct a print preview display processing.

What is claimed is:

1. An image forming apparatus comprising:
   a memory for storing both-side print data related to a page image corresponding to a plurality of pages,
   a display unit for displaying a print preview image based on said both-side print data stored in said memory,
   an operating member for accepting input of information, and
   a controller that controls the memory, the display unit and the operating member, wherein the controller is configured to
   perform processing for identifying a page of said page image that is to be formed on a front surface of an uppermost print media when both-side printing based on said both-side print data is performed, according to an information input through a prescribed operating member,
   display on the display unit the print preview image including a turned-over image,
   display as the turned-over image an image that shows a plurality of print media stacked together with a part of the uppermost media turned over, the turned-over image including a first area, a second area, and a third area in a single image,
   display in the first area a part of a page image of a page identified by the controller excluding a part of said page image hidden as a result of turning-over,
   display in the second area a part of a page image of a first page after the identified page, the part displayed in the second area being a part that is exposed as a result of turning over and that hides a first region as a result of turning over,
   display in the third area a part of a page image of a second page after the identified page, the part displayed in the third area being a part that is exposed as a result of turning over,
   display one each of page images of three pages at a glance within an area corresponding to one page by allotting, out of an area of the one page, a triangular area including a lower right corner to the second area, a triangular area neighboring the second area on an upper side thereof to the third area, and an area excluding the second and third areas to the first area, wherein the image forming apparatus further comprises an image processor for extracting from each of page images of two pages subsequent to the page identified by said page identifying member in accordance with a predetermined rule, an image in a partial area predetermined in said page image, an image of an area having a highest image density in said page image, or a photographic image included in said page image, wherein the controller switches two conditions according to an input operation through said operating member:

one condition in which a part of said page image of second and third pages to be formed on a section corresponding respectively to said second area and said third area by both-side printing based on said both-side print data is displayed on each of said second and said third areas of said turned-over image just as it is, and another condition in which an image extracted by said image processor is respectively displayed on each of said second area and said third area image, wherein when the another condition is selected, the controller displays, in each of the second and third areas, an image extracted by the image processor and corresponding thereto, and wherein the controller displays on said display unit said print preview image including an extracting-position indicating image which indicates the position, in the page image of the second and third pages respectively, of an image that was extracted by said image processor to be displayed on each of said second area and said third areas in said turned-over image.

2. An image forming apparatus according to claim 1, wherein said preview outputting member may display on said display unit said print preview image, in which a page image of a page previous to the page identified by said page identifying member and said turned-over image are aligned in a double-page spread.

3. An image forming apparatus according to claim 1, wherein said preview outputting member directly displays on said first area in said turned-over image a part of said page image to be formed on a section corresponding to said first area by both-side printing based on said both-side print data just as it is.

4. An image forming apparatus according to claim 1, wherein said extracting-position indicating image is an arrow image that is vector-representing a position of each of the images extracted by said partial image extractor started from each of said first area and said second areas.

5. A method of displaying a print preview image for an image forming apparatus, comprising:

storing both-side print data related to a page image corresponding to a plurality of pages, identifying a page of a page image, that is to be formed on a front surface of an uppermost print media when both-side printing based on the both-side print data is performed, according to an information input through operation, displaying said print preview image including a turned-over image, displaying as the turned-over image an image that shows a plurality of print media stacked together with a part of the uppermost media turned over, the turned-over image including a first area, a second area, and a third area in a single image, displaying in the first area a part of a page image of a page identified by the controller excluding a part of said page image hidden as a result of turning-over, display in the second area a part of a page image of a first page after the identified page, the part displayed in the second area being a part that is exposed as a result of turning over and that hides a first region as a result of turning over, displaying in the third area a part of a page image of a second page after the identified page, the part displayed in the third area being a part that is exposed as a result of turning over, displaying one each of page images of three pages at a glance within an area corresponding to one page by allotting, out of an area of the one page, a triangular area including a lower right corner to the second area, a triangular area neighboring the second area on an upper side thereof to the third area, and an area excluding the second and third areas to the first area, and extracting, from each of page images of two pages subsequent to the page identified in accordance with a predetermined rule, an image in a partial area predetermined in said page image, an image of an area having a highest image density in said page image, or a photographic image included in said page image, switching two conditions according to an input operation:

one condition in which a part of said page image of second and third pages to be formed on a section corresponding respectively to said second area and said third area by both-side printing based on said both-side print data is displayed on each of said second and said third areas of said turned-over image just as it is, and another condition in which an image extracted by said image processor is respectively displayed on each of said second area and said third area image, displaying, when the another condition is selected, in each of the second and third areas, an image extracted and corresponding thereto, and displaying said print preview image including an extracting-position indicating image which indicates the position, in the page image of the second and third pages respectively, of an image that was extracted by said image processor to be displayed on each of said second area and said third areas in said turned-over image.

* * * * *